US005121135A

United States Patent [19]

Deguchi et al.

[11] Patent Number: 5,121,135

[45] Date of Patent: Jun. 9, 1992

[54] THERMAL HEAD HAVING INTEGRAL ANALOG DRIVE COMPENSATION

[75] Inventors: Katsuyasu Deguchi, Nara; Takatoshi Mizoguchi, Gojo; Takayuki Taminaga, Yamatokoriyama; Akiyoshi Fujii, Ikoma, all of Japan

[73] Assignee: Sharp Kabushiki Kaisha, Osaka, Japan

[21] Appl. No.: 566,626

[22] Filed: Aug. 13, 1990

[30] Foreign Application Priority Data

Aug. 25, 1989 [JP] Japan .................................. 1-219200
Oct. 4, 1989 [JP] Japan .................................. 1-260530

[51] Int. Cl.[5] .............................................. G01D 15/10
[52] U.S. Cl. ............................................... 346/76 PH
[58] Field of Search .................... 346/76 PH; 361/400

[56] References Cited

U.S. PATENT DOCUMENTS

| | | | |
|---|---|---|---|
| 3,577,137 | 5/1971 | Brennan, Jr. | 340/324 |
| 3,725,898 | 4/1973 | Canton | 340/324 |
| 4,268,838 | 5/1981 | Nakano et al. | 346/76 PH |
| 4,510,507 | 4/1985 | Ishikawa | 346/76 PH |
| 4,633,269 | 12/1986 | Mikami et al. | 346/76 PH |
| 4,679,053 | 7/1987 | Katsurai et al. | 346/76 PH |
| 4,684,959 | 8/1987 | Mori et al. | 346/76 PH |
| 4,688,051 | 8/1987 | Kawakami et al. | 346/76 PH |
| 4,704,618 | 11/1987 | Gotoh et al. | 346/76 PH |
| 4,866,508 | 9/1989 | Eichelberger et al. | 361/400 |

FOREIGN PATENT DOCUMENTS

| | | | |
|---|---|---|---|
| 0112474 | 7/1984 | European Pat. Off. . | |
| 0244564 | 12/1985 | Japan | 346/76 PH |

OTHER PUBLICATIONS

C. Nelson, "Switching Controller Chip Handles 100 w from a 5-Pin Package", Dec. 1985, pp. 73-78, Electronic Design.

*Primary Examiner*—Benjamin R. Fuller
*Assistant Examiner*—Nancy Le
*Attorney, Agent, or Firm*—Nixon & Vanderhye

[57] ABSTRACT

A thermal head including a substrate, a plurality of thermal resistance elements formed on the substrate corresponding to print dots, a driving device for applying pulse voltage to the thermal resistance elements corresponding to print data, a temperature sensor provided on the substrate for sensing the temperature of the substrate, and an analog controller provided on the substrate and receiving an output from the temperature sensor for controlling the pulse voltage, so as to unify the print characteristic of the thermal resistance elements.

8 Claims, 11 Drawing Sheets

THERMAL HEAD HAVING INTEGRAL ANALOG DRIVE COMPENSATION

BACKGROUND OF THE INVENTION

1. Field of the Invention

The present invention relates to a thermal head which has a plurality of thermal resistors for printing and is mainly used for a facsimile and a thermal printer.

2. Description of the Prior Art

Conventionally, it is well known that a thermal head has the disadvantage that the print density is likely to be uneven depending upon the temperature, print cycle, heat history of the thermal resistors or the like. To unify the print density, there has been proposed a thermal head in which thermal resistors are controlled in drive current value and conducting period.

FIG. 16 is a block diagram showing a prior art embodiment of a thermal head driving device. A thermal head 1 has a thermal resistor 2, a driver IC 3 driving the thermal resistor 2 and a thermistor 13 sensing the temperature of the thermal head. An A/D converter 4 converts analog temperature data received from the thermistor 13 into digital temperature data to apply it to a microcomputer 7. In an address of a ROM table 10 determined based upon the digital temperature data, print cycle data, head history data and the like, the microcomputer 7 accesses the ROM table 10 to obtain drive pulse width data and applies the drive pulse width data to a pulse width control circuit 5. The pulse width control circuit 5 generates a drive pulse signal ($\overline{\text{STROBE}}$ signal) having its pulse width controlled. In this way, the print density by the thermal head 1 keeps uniform (see International Application No. PCT/US87/01663, for example).

However, such a conventional thermal head driving device must have a considerably large capacity of memory of a circuit for externally driving the thermal head and considerably large amount of control program of the microcomputer, and further requires an expensive A/D converter in view of the digital processing of the microcomputer. Additionally, with a control system of a drive pulse for a thermal resistor provided in the thermal head, there arises the problem that the size of the thermal head is considerably increased.

SUMMARY OF THE INVENTION

The present invention provides a thermal head comprising a substrate, a plurality of thermal resistance elements formed on the substrate corresponding to print dots, driving means for applying pulse voltage to the thermal resistance elements corresponding to print data, temperature sensing means provided on the substrate for sensing the temperature of the substrate, and analog controlling means provided on the substrate and receiving an output from the temperature sensing means for controlling the pulse voltage, so as to unify the print characteristic of the thermal resistance elements.

With the present invention, the peak value of the drive pulse may be controlled inside the thermal head in accordance with the temperature of the thermal head, while the pulse width of the drive pulse may be controlled in accordance with other factors outside the thermal head, or the pulse width may be controlled inside the thermal head, while the peak value of the drive pulse may be controlled outside the same.

The thermal head has 500 to 5000 thermal resistors linearly disposed on an insulating substrate usually made of ceramic or the like excellent in resisting property and flatness, each of which is preferably formed so that it can output pixels.

In sensing the temperature of the thermal head, the temperature sensing means may be a thermistor manufactured by mixing Fe O with solid solution of $MgCr_2O_4$ or $MgAl_2O_4$, NiO, $Mn_2O_3$ and $CO_2O_3$ and sintered them altogether. In this case, the temperature sensing means is preferably placed close to the thermal resistors so as to sense the temperature of the thermal head and converted into a resistance value.

As control means for controlling the peak value of the drive pulse, a 4-terminal regulator of which output voltage varies in accordance with a variation in resistance (e.g., PQ30RV manufactured by Sharp Corporation) is desirable in that it is cheap and simple in its circuit configuration. If drive pulse width control means should be placed inside the thermal head, that which has a voltage comparator of which difference voltage varies in accordance with the variation in resistance is used to convert a sawtooth-formed integrating wave into a square wave for a pulse control is desirable in that it is cheap and simple in its circuit configuration.

DESCRIPTION OF THE PREFERRED EMBODIMENTS

Figure 1:
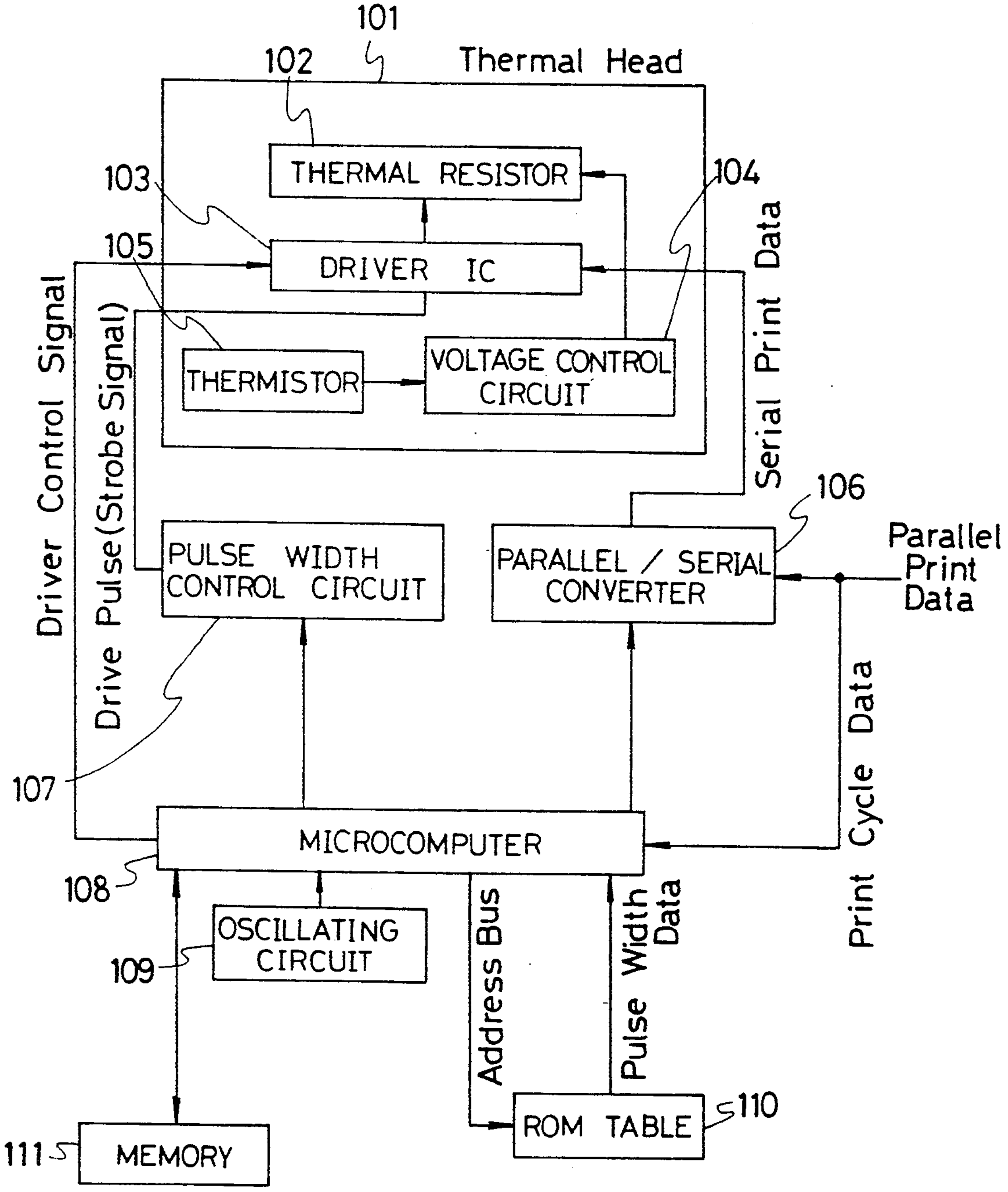
FIG. 1 is a block diagram showing a first embodiment of the present invention.

First to fourth embodiments according to the present invention will now be described in conjunction with the accompanying drawings. In the drawings, like reference numerals denote corresponding components in the drawings.

FIG. 1 is a block diagram showing a first embodiment according to the present invention. A thermal head 101 comprises a plurality of thermal resistors 102, a plurality of driver ICs 103 driving the thermal resistors 102, a thermistor 105 sensing a temperature of the thermal head 101 and a voltage control circuit 104 for controlling voltage VH driving the thermal resistors 102. In a facsimile or a printer, usually print data processed by a main CPU is parallel data (e.g., eight bit data), the parallel print data transferred from the main CPU is converted into serial print data by a parallel/serial converter 106, and the serial print data is transferred to the driver ICs 103 provided in the thermal head 101 along with a driver control signal.

Figure 2:
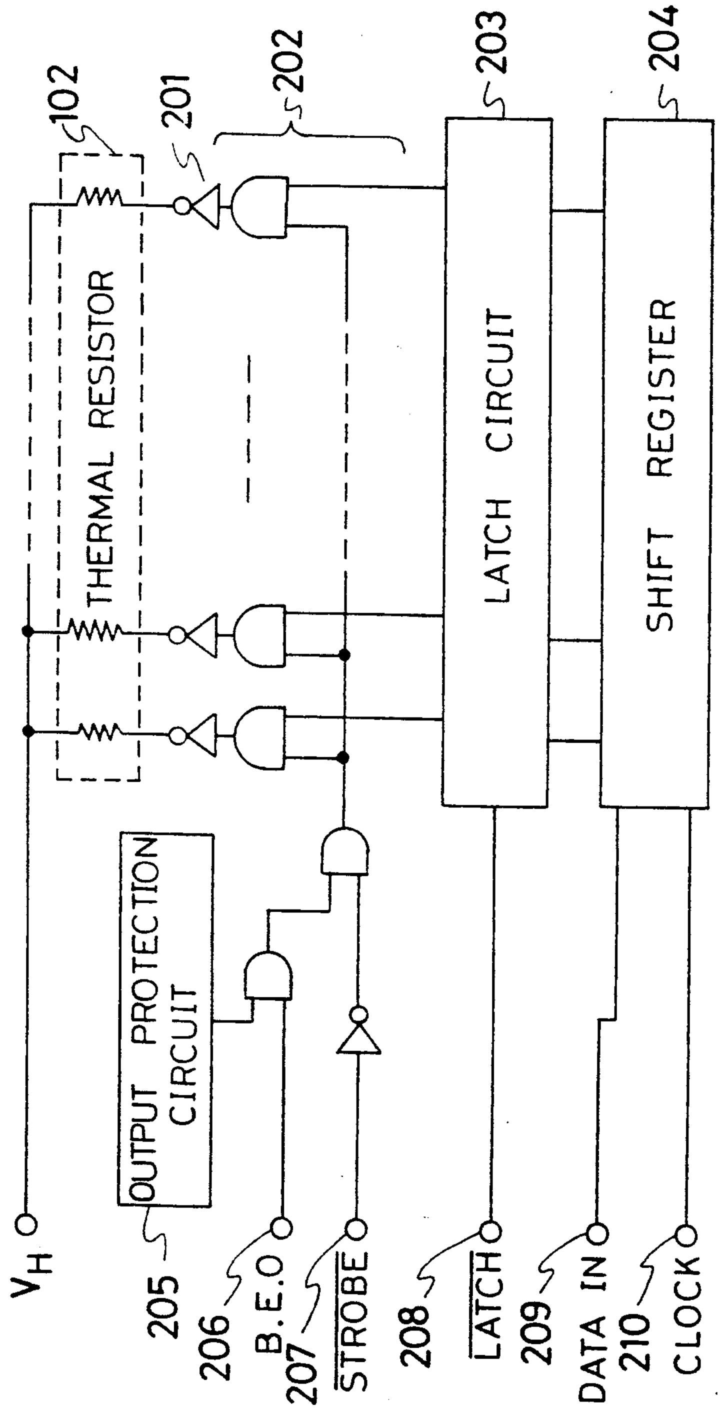
FIG. 2 is a basic circuit diagram of a thermal resistor and a driver IC shown in FIG. 1.

FIG. 2 is a basic circuit diagram of one of the driver ICs 103 shown in FIG. 1. The driver IC 103 includes drivers (inverters) 201 made of transistors, a gate circuit 202, a latch circuit 203, a shift register 204 and an output protection circuit 205. A signal applied to the driver IC 103 is composed of serial print data (inputted from a DATAIN terminal), a driver control signal (a B.E.O signal, a $\overline{\text{LATCH}}$ signal and a CLOCK signal) and a $\overline{\text{STROBE}}$ signal. The voltage control circuit 104 in FIG. 1 is used for converting a variation in resistance of the thermistor 105 into a voltage (the peak value of a pulse) variation using a direct currentoutput voltage-stabilizing 4-terminal regulator IC in which an arbitrary direct current output voltage can be set by external resistance, as shown in FIG. 4.

Figure 3:
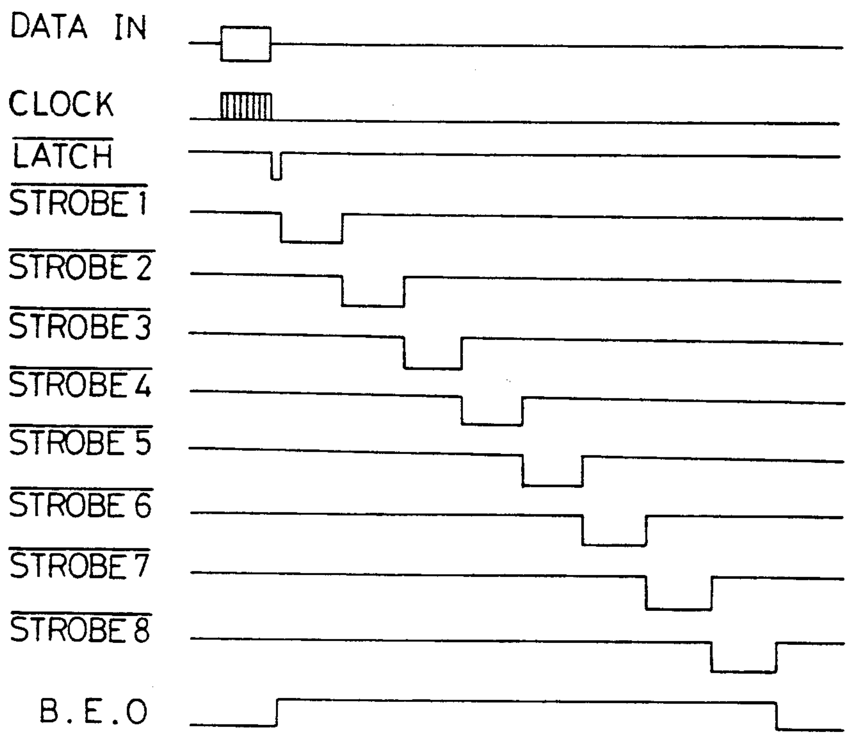
FIG. 3 is a timing chart for explaining the operation of an embodiment shown in FIG. 1.

Then, referring to a timing chart in FIG. 3 and a basic circuit diagram of the driver IC 103 in FIG. 2, a case in which the thermal head is driven on the eight-parts-a-line, namely, a case in which a single line of thermal resistors are divided into eight groups driven by the driver IC 103. First, serial print data inputted to a DATAIN terminal 209 is synchronized with a CLOCK signal inputted to a CLOCK terminal 210 to send it to a shift register 204. Then, a $\overline{\text{LATCH}}$ pulse signal inputted to a $\overline{\text{LATCH}}$ terminal 208 permits a latch circuit 203 to latch the serial print data in the shift register 204. A B.E.O signal makes a B.E.O terminal 206 turn to "HIGH" so that the driver 201 can start, and thereafter a $\overline{\text{STROBE}}$ signal of a drive pulse inputted through a $\overline{\text{STROBE}}$ terminal 207 starts up the thermal resistors 102 to turn on or off $\overline{\text{STROBE 1}}$ to $\overline{\text{STROBE 8}}$, respectively, as shown in FIG. 3. Finally, the B.E.O terminal 206 is turned back to "LOW", and thus a single line printing is completed.

Figure 5:
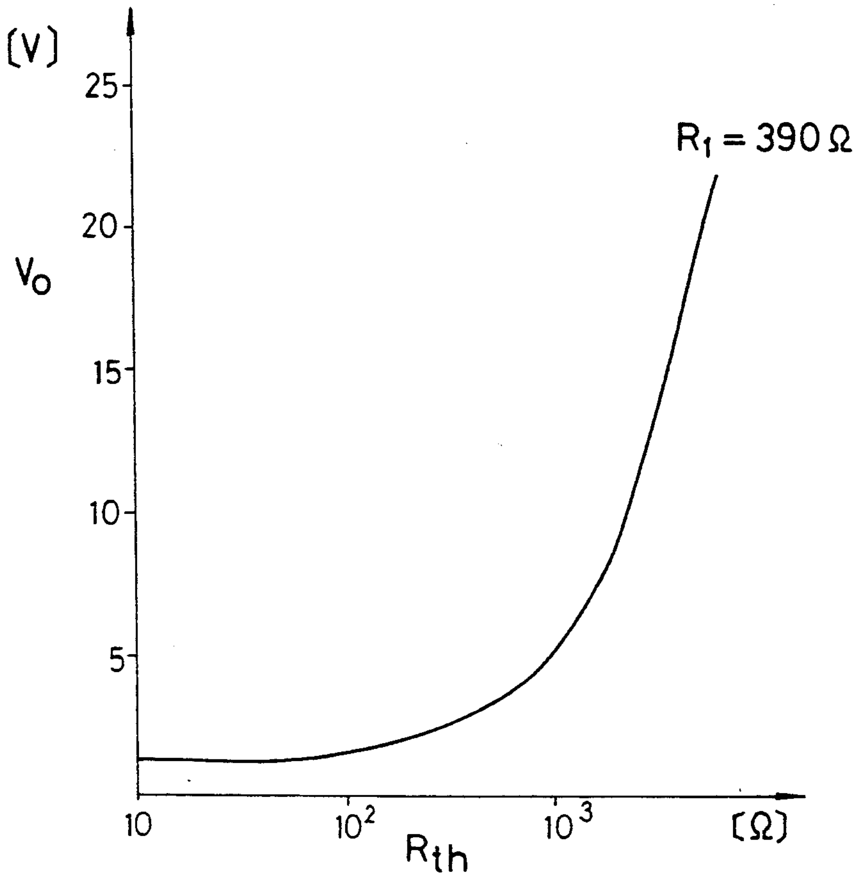
FIG. 5 is a graph showing an output voltage characteristic of the voltage control circuit shown in FIG. 4.
Figure 6:
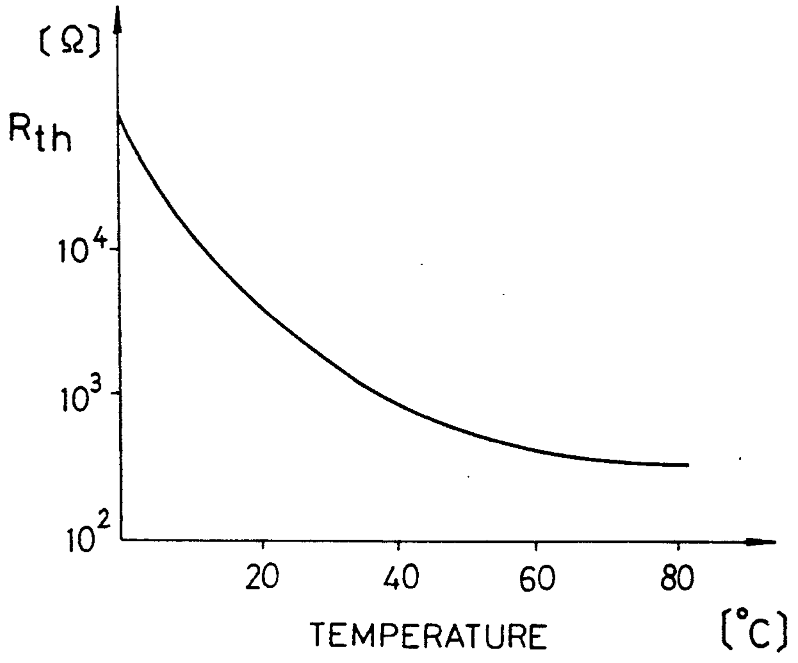
FIG. 6 is a graph showing a temperature-resistance characteristic of a thermistor shown in FIG. 4.

Then, referring to FIGS. 4 to 6, it will be explained how drive voltage VH (the peak value of a drive pulse) is determined.

Figure 4:
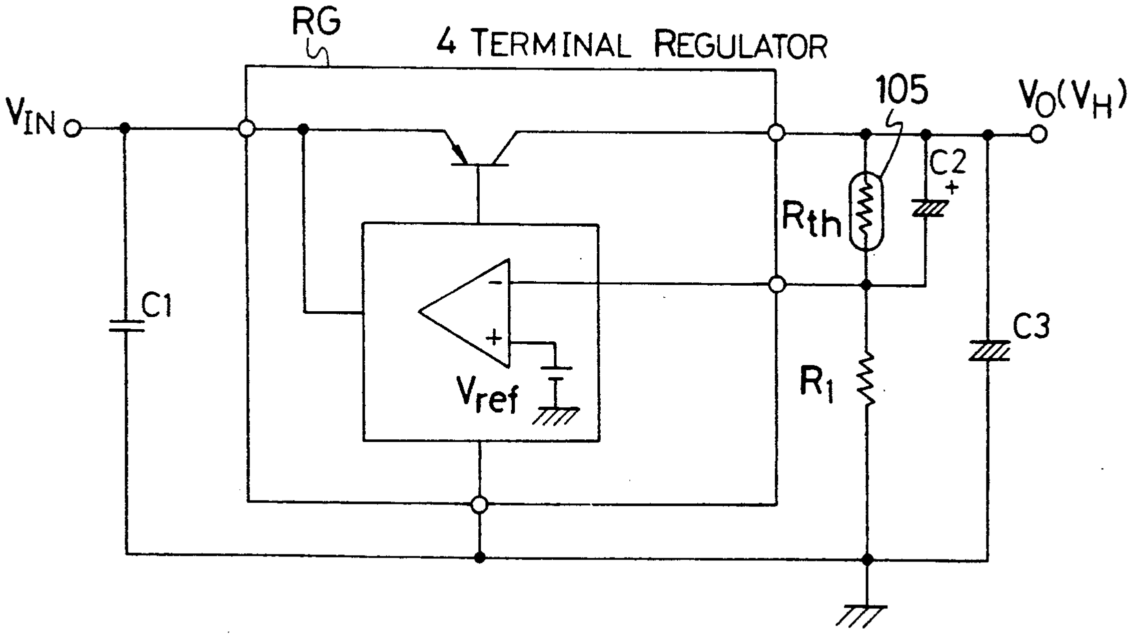
FIG. 4 is a circuit diagram of a voltage control circuit shown in FIG. 1.

FIG. 4 is a connection diagram of the voltage control circuit 104 employed in this embodiment.

A 4-terminal regulator (e.g., PQ30RV manufactured by Sharp Corporation) RG has reference voltage and a comparator inside it, and output voltage V0 is determined by an external resistance R1 and the thermistor 105. VIN denotes input voltage (e.g., DC24V) supplied from the outside of the thermal head 101, and C1 to C3 denote external capacitors. FIG. 5 is a graph showing a variation in the output voltage V0 related to a resistance value Rth of the thermistor 105 when resistance R1 is 390 Ω is satisfied. FIG. 6 represents a temperature characteristic of the thermistor 105 (FIG. 1), where as the temperature rises, the resistance value Rth of the thermistor 105 falls. Thus, when the respective components are connected as shown in FIG. 4, as the temperature of the thermal head rises, the resistance Rth of the thermistor falls and the output voltage VH of the 4-terminal regulator also falls. Therefore, using the output voltage V0 as the drive voltage VH of the thermal resistor, the print density can be unified.

The above description is an example in which a voltage control circuit is provided in the thermal head to control drive voltage (the peak value) related to temperature, and other external factors control the pulse width. Then, referring to FIGS. 7 to 9, a second embodiment of the present invention in which a pulse width control circuit is provided inside the thermal head to control pulse width depending on temperature, and other external factors drive voltage will be described below.

Figure 7:
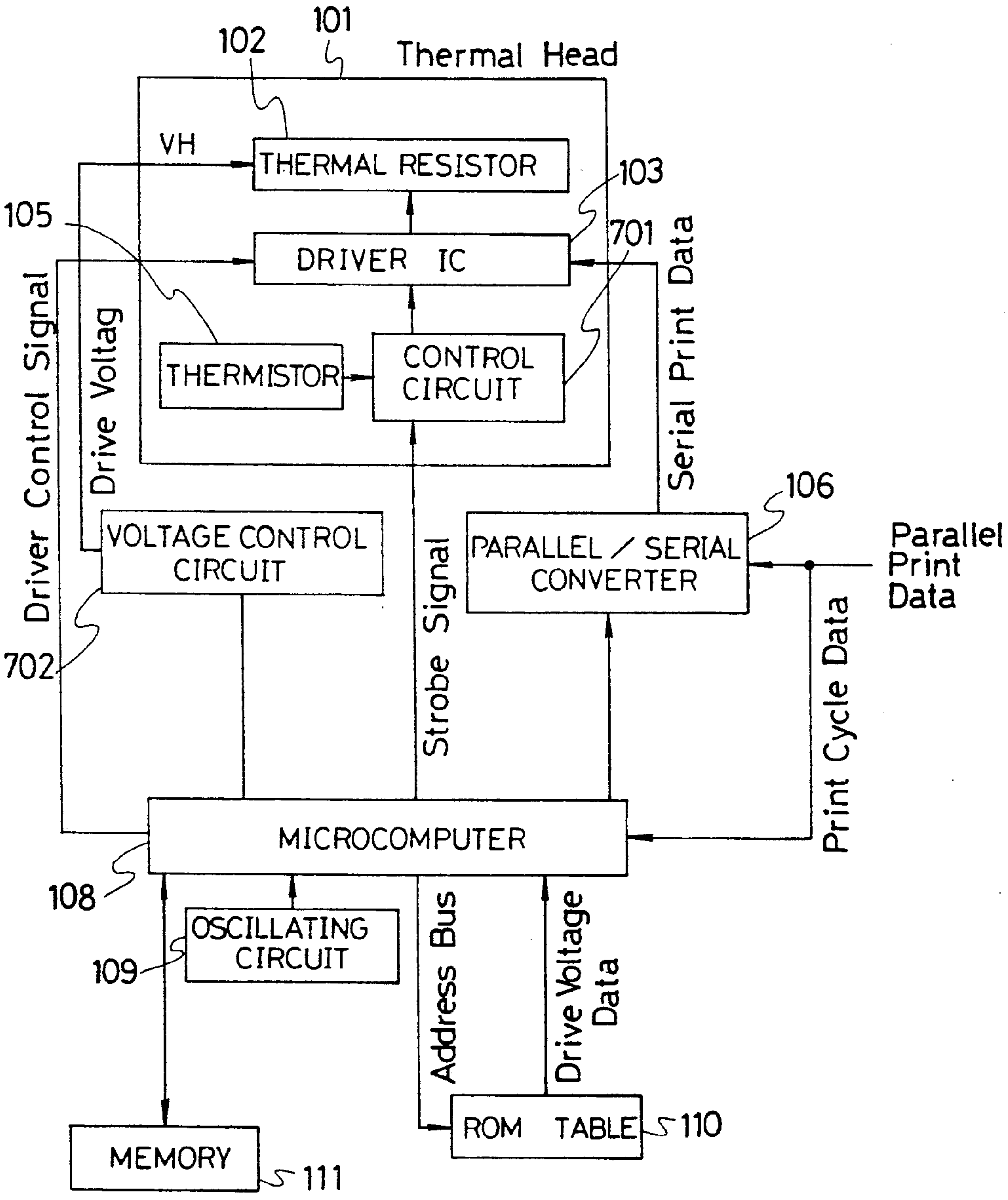
FIG. 7 is a block diagram showing a second embodiment of the present invention.
Figure 8:
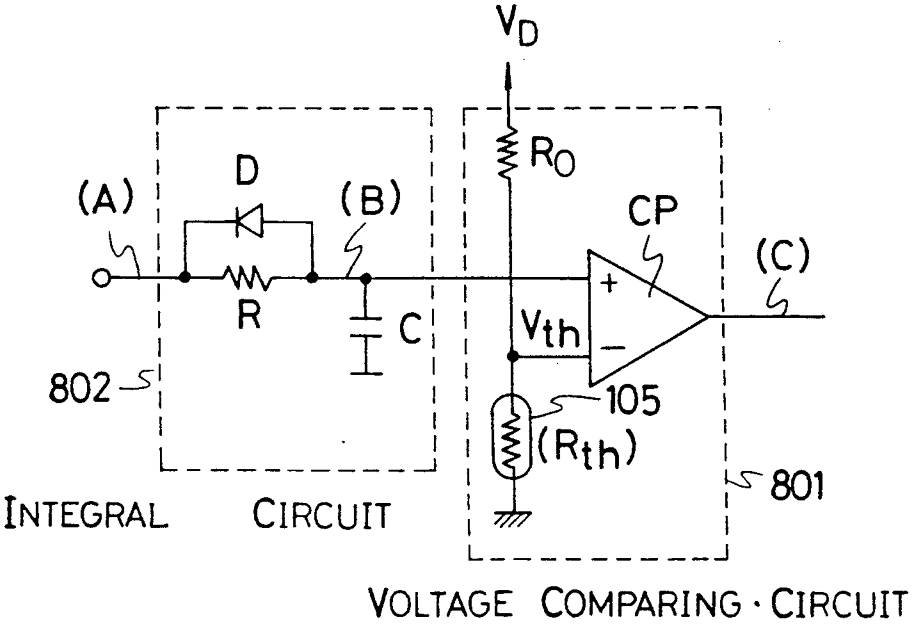
FIG. 8 is a circuit diagram showing a pulse width control circuit of an embodiment shown in FIG. 7.
Figure 9:
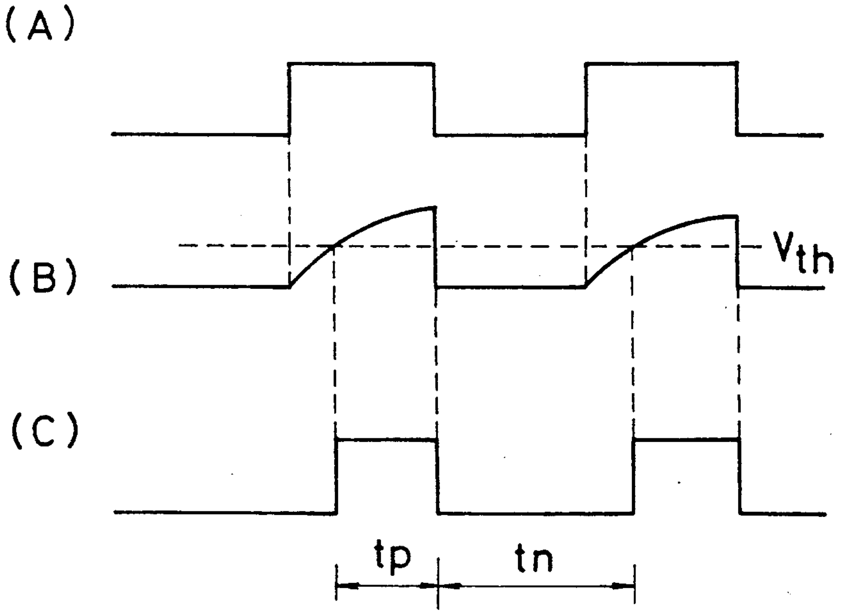
FIG. 9 is a timing chart showing waveforms of parts in the electric circuit shown in FIG. 8.

In FIG. 7 which is a block diagram showing a second embodiment, a pulse width control circuit 701 provided in the thermal head, and drive voltage VH is controlled by a voltage control circuit 702 outside of the thermal head. The remaining part is equivalent to the embodiment shown in FIG. 1. The pulse width control circuit 701 is composed of an integral circuit 802 consisting of a capacitor C, a resistance R and a diode D and a voltage comparing circuit 801 consisting of a resistance RO, a thermistor 105 and a comparator CP, as shown in FIG. 8. The reference voltage Vth of the comparator CP is varied in accordance with a variation in the resistance value Rth of the thermistor 105, a drive pulse width tp varies. FIG. 9 shows waveforms in points (A), (B) and (C) of the circuit shown in FIG. 8. The strobe signal of negative logic is shaped by the pulse width control circuit 701, and thereafter it is inputted to a $\overline{\text{STROBE}}$ terminal 207 of the driver IC 103. As a result, as the temperature rises, the resistance value Rth of the thermistor 105 falls, and the reference voltage Vth of the voltage comparing circuit 101 falls. This causes an output pulse width tp to get larger, that is, causes a pulse width Th of the negative logic to get smaller, whereby the print density can be unified related to the temperature.

As has been described, with a relatively simple circuit, the drive voltage control or the drive pulse width pulse control can be performed through a temperature variation independently inside the thermal head. Additionally, externally controlling the drive pulse width or the drive pulse voltage as required, energy supplied to the thermal resistor can be controlled.

Figure 10:
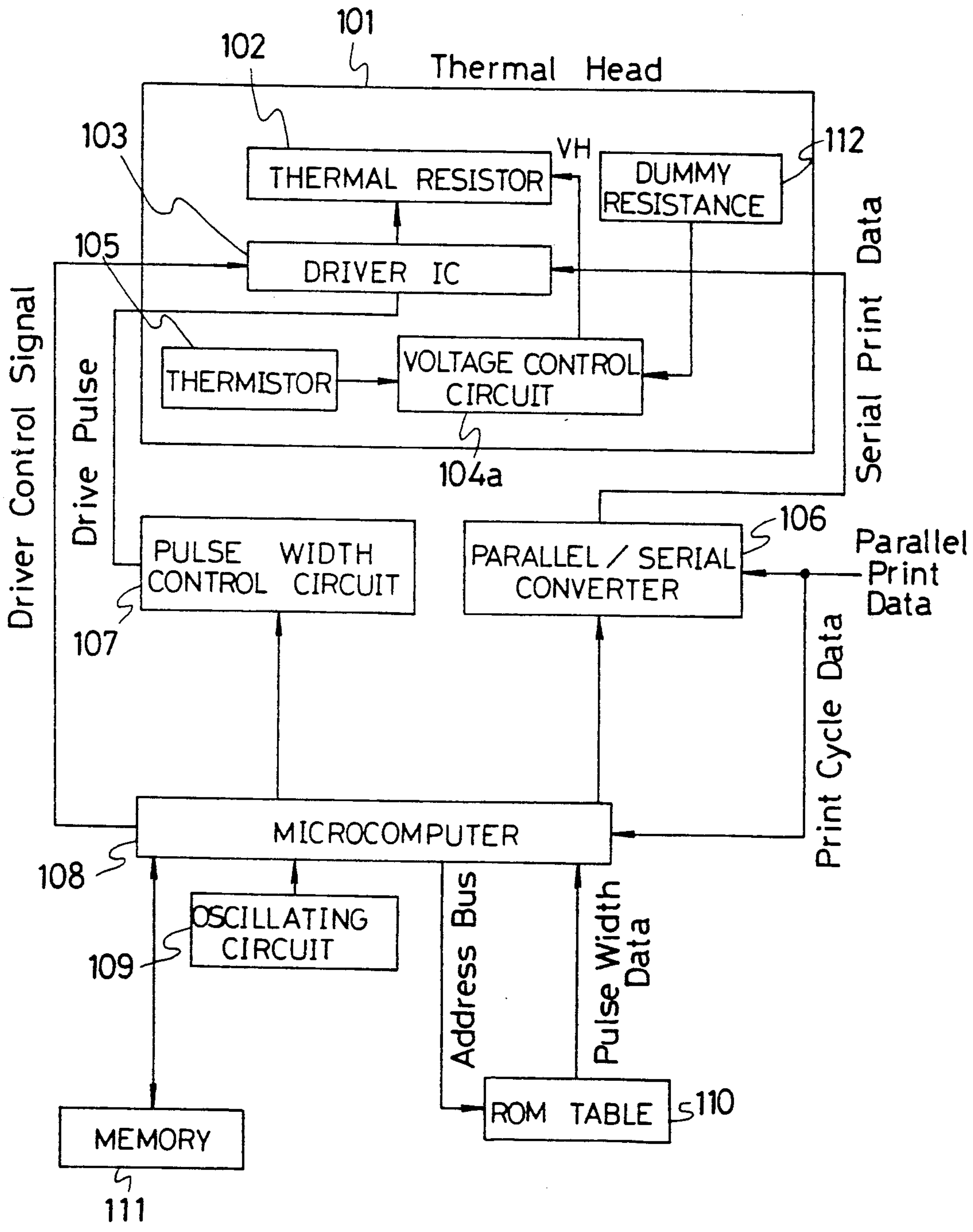
FIG. 10 is a block diagram showing a third embodiment of the present invention.

Then, a third embodiment of the present invention will be described in detain in conjunction with FIGS. 10 to 13. FIG. 10 is a block diagram showing an this embodiment. A thermal head 101 comprises a plurality of thermal resistors 102, a dummy resistance 112 formed on the same substrate through the same manufacturing process, a plurality of driver ICs 103 driving the thermal resistors 102, a thermistor 105 sensing the temperature of the thermal head 101 and a voltage control circuit 104*a* for controlling voltage VH driving the thermal resistors 102. The resistance 112 is formed of the same material as the resistors 102.

The remaining part of the structure in FIG. 10 is equivalent to the corresponding one in FIG. 1.

Then, referring to FIGS. 11 to 13, the way the drive voltage VH is determined in this embodiment will be explained.

Figure 11:
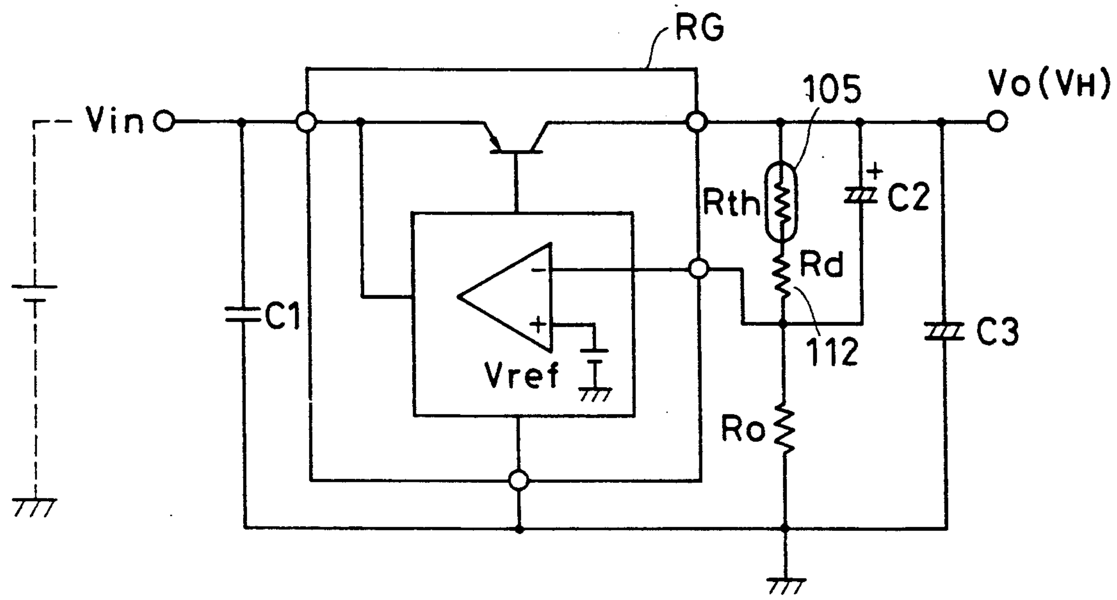
FIG. 11 is a circuit diagram showing a voltage control circuit shown in FIG. 10.

FIG. 11 is a connection diagram showing the voltage control circuit 104*a* employed in this embodiment. A 4-terminal regulator (PQ30RV manufactured by Sharp Corporation) which is the same as that employed in the first embodiment has reference voltage and a comparator inside it, and its output voltage is determined depending on an external resistance. VIN denotes DC voltage applied from the outside of the thermal head 101. C1 to C3 denote external capacitors, while R0 denotes a resistance. The dummy resistance 112 is not necessarily the same as one of the thermal resistors 102 in shape, for example, it may be manufactured with a reference of Rd (Ω).

As shown in FIG. 11, when the thermistor 105 (resistance value Rth) and the dummy resistance 112 are connected in series, the resistance value Rth of the thermistor 105 increases, but when the resistance value Rd of the dummy resistance 112 increases, the output voltage V0, or the drive voltage VH of the thermal resistors, rises.

Figure 12:
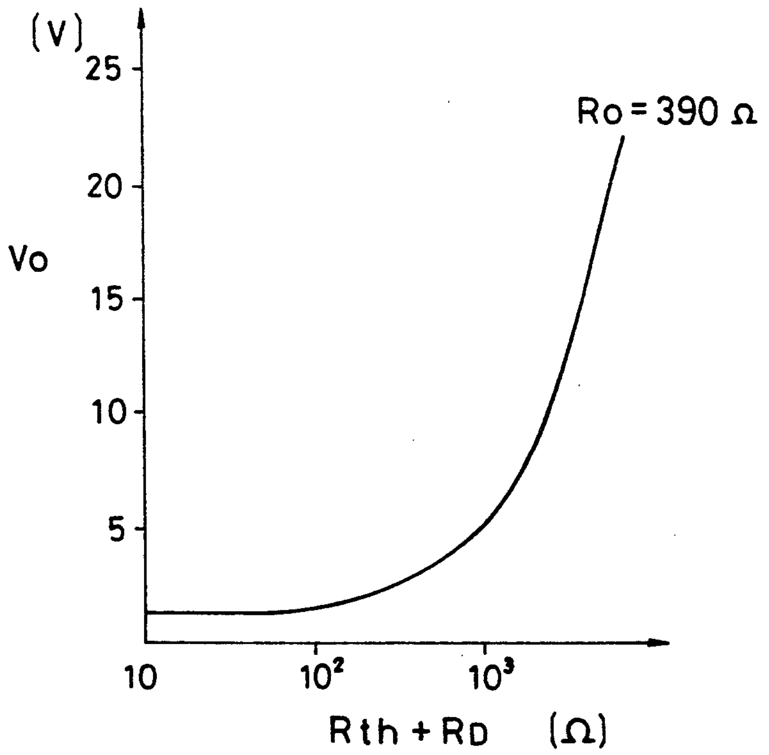
FIG. 12 is a graph showing an output voltage characteristic of the voltage control circuit shown in FIG. 11.
Figure 13:
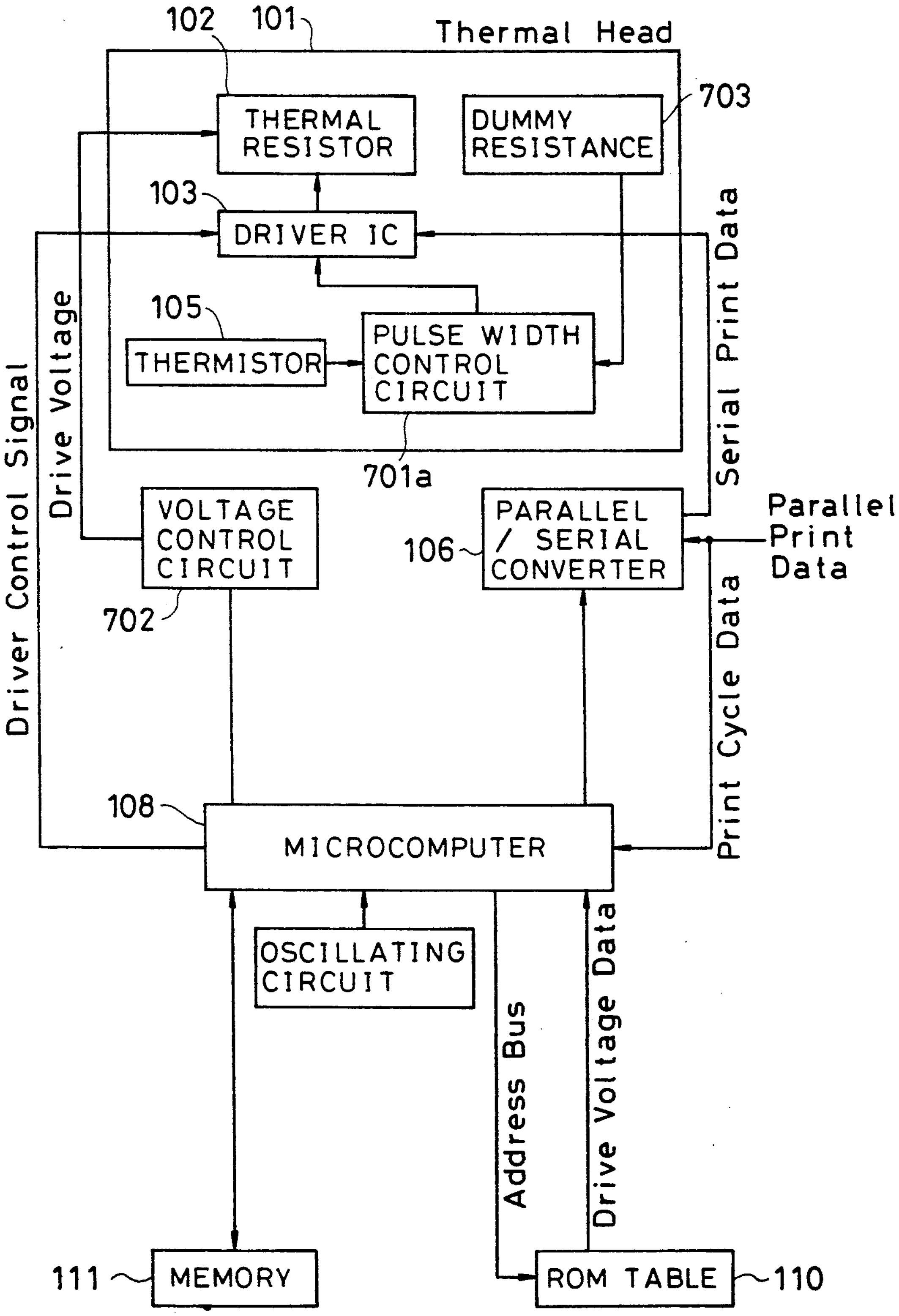
FIG. 13 is a block diagram showing a fourth embodiment of the present invention.

FIG. 12 is a graph showing a variation in the output voltage V0 related to Rth+Rd when a predetermined voltage VIN is applied under the condition of R0=390 Ω in FIG. 11. The temperature characteristic of the thermistor 105 is equivalent to that shown in FIG. 6, and hence as the temperature rises, the resistance value falls.

Consequently, with the respective components connected as shown in FIG. 11, the drive voltage VH rises when the resistance value Rd of the dummy resistance 112 is large, and then energy applied to the thermal resistors 102 gets larger. When the resistance value of the thermistor 105 is small on the basis of the applied energy, or when the temperature of thermal head rises, the drive voltage VH falls, and the energy applied to the thermal resistors 102 decreases, so that the print density can keep uniform related to the unevenness of the resistance values of the thermal resistors peculiar to the thermal heads or the temperature variation of the thermal head.

The above description is an example in which a voltage control circuit is provided inside the thermal head to control drive voltage corresponding to the resistance value of the thermal resistors and temperature of the thermal head, and external factors other than the above-mentioned resistance value and temperature (e.g., print cycle, the number of print dots in a single line and the like) control a pulse width. Then, referring to FIGS. 13 to 15, a fourth embodiment in which a pulse width control circuit is provided inside the thermal head to perform the pulse width control corresponding to the resistance values of the thermal resistors and the temperature of the thermal head, and external factors other than the above-mentioned resistance values and temperature control the drive voltage will be described below. FIG. 13 of this embodiment showing this embodiment corresponding to FIG. 7 showing the previous embodiment. A pulse width control circuit 701*a* controlling a width of the $\overline{\text{STROBE}}$ signal in FIG. 3 is provided inside the thermal head 101, drive voltage VH is controlled by a voltage control circuit 702 outside the thermal head. The remaining part of this structure is equivalent to that of the block diagram in FIG. 7.

Figure 14:
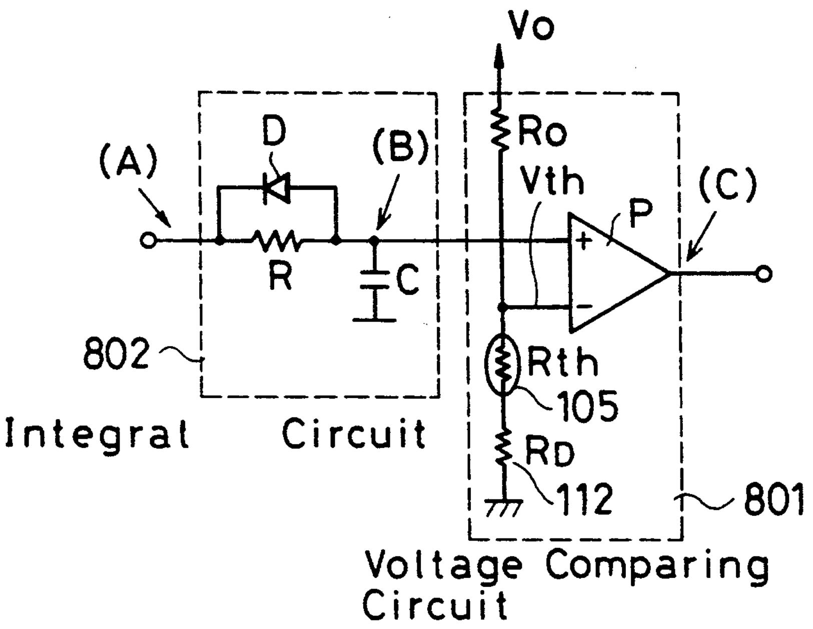
FIG. 14 is a circuit diagram showing a pulse width control circuit of the embodiment shown in FIG. 13.
Figure 15:
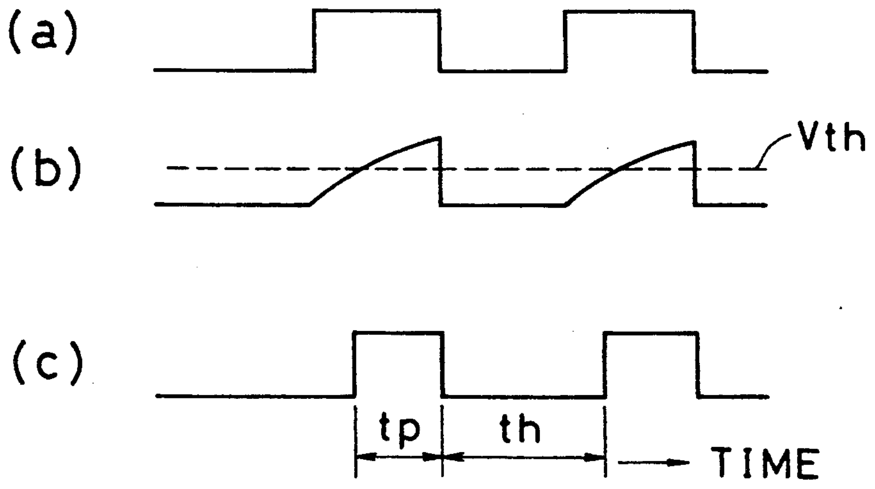
FIG. 15 is a timing chart showing waveforms of parts of the electric circuit shown in FIG. 14.
Figure 16:
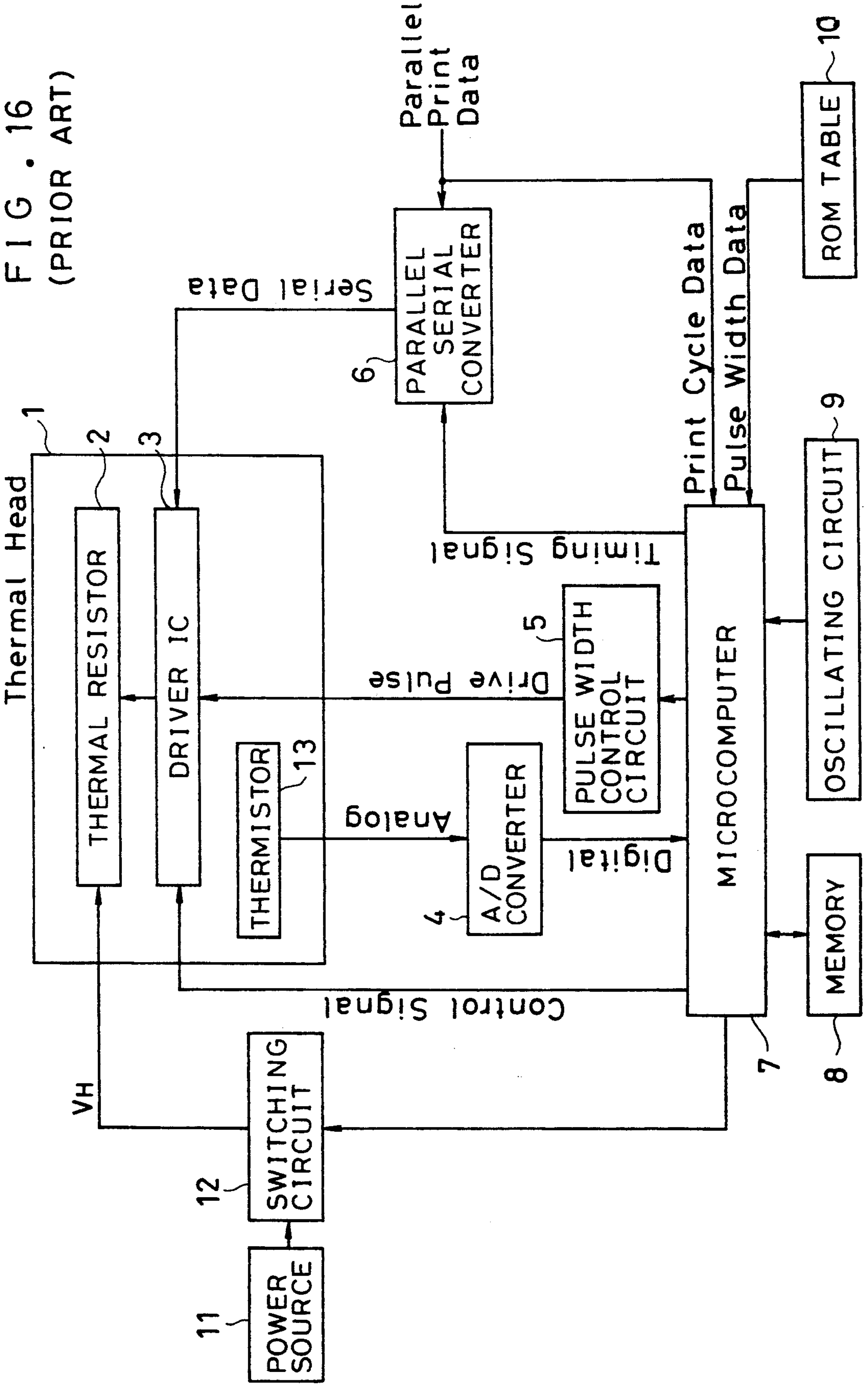
FIG. 16 (PRIOR ART)
FIG. 16 is a block diagram showing a prior art embodiment.

The pulse width control circuit 701*a* is composed of an integral circuit 802 consisting of a resistance R, a capacitor C and a diode D and a voltage comparing circuit 801 consisting of a comparator P, as shown in FIG. 14. The reference voltage Vth of the comparator P is varied in accordance with the resistance Rth of the thermistor 105, and a drive pulse width tp varies. FIG. 15 shows voltage waveforms in points (A), (B) and (C) in FIG. 14. As can be seen, as the voltage Vth rises, the output pulse width tp becomes small.

With the dummy resistance 112 and the thermistor 105 connected as shown in FIG. 14, when the resistance value Rd of the dummy resistance 112 is large, the drive pulse width tp becomes larger, that is, a negative logic pulse width tn becomes smaller.

When the temperature of the thermal head rises and the resistance value Rth of the thermistor 105 lowers on the basis of the pulse width, the drive pulse width tp becomes further smaller, and the negative logic pulse width tn becomes smaller. Then, a strobe signal of the negative logic is shaped by a pulse width control circuit 701, and thereafter it is inputted to a $\overline{\text{STROBE}}$ terminal 207 of the driver IC 103. As a result, the print density can keep uniform independent of unevenness of the resistance values of the thermal resistors in thermal heads, aged deterioration and temperature variation.

As has been described, a dummy resistance and a relatively simple circuit makes it possible that inside a thermal head, the drive voltage control or the drive pulse control can be independently performed outside the thermal head corresponding to a resistance value and temperature of its own thermal resistor. Additionally, externally controlling the drive pulse width and the drive voltage at the same time as required, the print density can be unified.

In the above embodiments, energy applied to the thermal resistors is controlled dependent on the factor of unevenness of the print density other than the resistance value and temperature of the thermal resistors. However, this process can be omitted for the cost reduction. The drive on the basis of eight-parts-a-line has been explained in the embodiments, but it is intended that the present invention not be limited to it.

What is claimed is:

1. A thermal print head comprising:
a substrate;
a plurality of thermal resistance printing elements formed on said substrate corresponding to print dots;
driving means for applying pulsed voltage signals to said thermal resistance elements corresponding to print data;
temperature sensing means provided on said substrate for sensing substrate temperature and providing a corresponding output signal; and
analog control means provided on said substrate and receiving said output signal, for changing a magnitude of the pulsed voltage signals in inverse proportion to the substrate temperature so as to make more uniform a printing characteristic of said thermal resistance elements.

2. A thermal print head according to claim 1, wherein said control means comprises means for controlling a pulse amplitude of the pulsed voltage.

3. A thermal print head according to claim 1, wherein said control means comprises means for controlling a pulse width of the pulsed voltage.

4. A thermal print head comprising:
a substrate;
a plurality of thermal resistance printing elements formed of a predetermined material on said substrate corresponding to print dots;
a dummy resistance element also formed on said substrate of the same material as said thermal resistance elements but located so as never to contribute to printing;
drive means for applying pulsed voltage signals to said thermal resistance elements corresponding to print data;

a temperature sensing resistance provided on said substrate for sensing substrate temperature and providing a corresponding output signal; and analog control means provided on said substrate for changing a magnitude of the pulsed voltage signals in inverse proportion to the substrate temperature and in proportion to a resistance value of said dummy resistance element, so as to make more uniform a printing characteristic of said thermal resistance elements.

5. A thermal print head according to claim 4, wherein said control means comprises means for controlling a pulse amplitude of the pulsed voltage.

6. A thermal print head according to claim 4, wherein said control means comprises means for controlling a pulse width of the pulsed voltage.

7. A thermal print head according to claim 4, wherein said temperature sensing resistance has a negative temperature coefficient of resistivity.

8. A thermal print head according to claim 7, wherein the analog control means change the magnitude of the pulsed voltage signals corresponding to a sum of resistance values of said temperature sensing resistance and dummy resistance element.

* * * * *